US008392963B2

(12) United States Patent
Shulman et al.

(10) Patent No.: US 8,392,963 B2
(45) Date of Patent: Mar. 5, 2013

(54) TECHNIQUES FOR TRACKING ACTUAL USERS IN WEB APPLICATION SECURITY SYSTEMS

(75) Inventors: Amichai Shulman, Givataim (IL); Gur Shatz, Rehovot (IL); Tal Ryterski, Ramat-Gan (IL)

(73) Assignee: Imperva, Inc., Redwood Shores, CA (US)

( * ) Notice: Subject to any disclaimer, the term of this patent is extended or adjusted under 35 U.S.C. 154(b) by 1034 days.

(21) Appl. No.: 11/563,589

(22) Filed: Nov. 27, 2006

(65) Prior Publication Data

US 2007/0124806 A1    May 31, 2007

Related U.S. Application Data

(60) Provisional application No. 60/739,955, filed on Nov. 28, 2005.

(51) Int. Cl.
*G06F 7/04* (2006.01)
*G06F 17/30* (2006.01)

(52) U.S. Cl. .......................................................... 726/2
(58) Field of Classification Search ...................... 726/2
See application file for complete search history.

(56) References Cited

U.S. PATENT DOCUMENTS

| 6,223,289 | B1 | 4/2001 | Wall et al. | |
|---|---|---|---|---|
| 6,763,468 | B2 | 7/2004 | Gupta et al. | |
| 6,957,390 | B2 * | 10/2005 | Tamir et al. | 715/744 |
| 7,020,645 | B2 * | 3/2006 | Bisbee et al. | 1/1 |
| 7,231,657 | B2 * | 6/2007 | Honarvar et al. | 726/2 |
| 7,562,382 | B2 * | 7/2009 | Hinton et al. | 726/2 |
| 7,586,871 | B2 * | 9/2009 | Hamilton et al. | 370/328 |
| 7,640,235 | B2 | 12/2009 | Shulman et al. | |
| 7,647,627 | B2 * | 1/2010 | Maida-Smith et al. | 726/12 |
| 7,743,420 | B2 | 6/2010 | Shulman et al. | |
| 7,752,662 | B2 | 7/2010 | Shulman et al. | |
| 2003/0014665 | A1 | 1/2003 | Anderson et al. | |
| 2004/0103021 | A1 | 5/2004 | Scarfe et al. | |
| 2005/0071642 | A1 | 3/2005 | Moghe et al. | |
| 2005/0108567 | A1 | 5/2005 | D'Souza et al. | |
| 2005/0216955 | A1 | 9/2005 | Wilkins et al. | |
| 2006/0272008 | A1 | 11/2006 | Shulman et al. | |
| 2007/0124806 | A1 | 5/2007 | Shulman et al. | |
| 2007/0294539 | A1 | 12/2007 | Shulman et al. | |
| 2008/0016551 | A1 * | 1/2008 | Pinkas et al. | 726/2 |
| 2008/0065640 | A1 | 3/2008 | Shulman et al. | |
| 2008/0320567 | A1 | 12/2008 | Shulman et al. | |
| 2010/0251377 | A1 | 9/2010 | Shulman et al. | |

OTHER PUBLICATIONS

Gartner It Security Summit, Imperva Delivers First True Gigabit Application Firewall Solution, News & Events, Press Release, http://web.archive.org/web/20060312094936/www.imperva.com/company/news/2005-jun-06.html, Imperva Inc., Jun. 6, 2005, pp. 3, Washington, DC, USA.

Imperva SecureSpehre™ Data Security Solutions, Products, SecureSpere, http://web.archive.org/web/20060312093140/www.imperva.com/products/securesphere/, Imperva Inc, 2006, p. 1.

(Continued)

*Primary Examiner* — William Powers
*Assistant Examiner* — Dant Shaifer Harriman
(74) *Attorney, Agent, or Firm* — Blakely Sokoloff Taylor & Zafman, LLP

(57) ABSTRACT

A method for tracking and identifying an identity of a user accessing a web application. An application normal behavior profile (NBP), wherein said NBP includes a plurality of authentication identifiers of the web application is generated. It is determined using the NBP whether an authentication request submitted by the user was successful. A first actionable data on a successful authentication request is saved. A second actionable data on an unsuccessful authentication request is saved.

81 Claims, 4 Drawing Sheets

OTHER PUBLICATIONS

Imperva Inc., SecureSpehre™ Web Application Firewall The Industry's Only Automated Web Application Firewall, Products, Resources, Database, SecureSphere Web Application Firewall Datasheet, http://web.archive.org/web/20060312092739/www.imperva.com/products/securesphere/resources.asp, 2006, pp. 4.

Imperva Inc., Imperva SecureSpehre™ Dynamic Profiling Firewall, Product, SecureSphere, http://web.archive.org/web/20050207181514/www.imperva.com/products/securesphere/, 2005, pp. 2.

Imperva Inc., Imperva Delivers Unique Security Insight into Applications in Production, News & Events, Press Releases, New Release of SecureSphere Extends the Reach of Innovative Dynamic Profiling Technology, http://web.archive.org/web/20050207165342/www.imperva.com/company/news/2004-dec-13.html, Dec. 13, 2004, pp. 3, Foster City, California, Usa.

Imperva Inc., Web and Database Firewalls, Products, SecureSpere™, Dynamic Profiling, http://web.archive.org/web/20041224083525/www.imperva.com/products/securesphere/web_database_firewalls.html, 2004, pp. 2.

Imperva Inc., Ready to take a test drive?, Products, SecureSpere™, Demo, http://web.archive.org/web/20041224085514/www.imperva.com/products/securesphere/demo.html, 2005, pp. 2.

Imperva Inc., Freeware IT security test tools, Application Defense Center, tools, http://web.archive.org/web/20041223174325/www.imperva.com/application_defense_center/tools.asp, 2005, p. 1.

Imperva Inc., Products, SecureSpehre™, White Papers, http://web.archive.org/web/20041224085413/www.imperva.com/products/securesphere/white_papers.asp, 2005, pp. 2.

Imperva Inc., Traditional Web Application Security vs. SecureSphere, A comparison of Hard Trigger Rules vs. Correlated Attack Validation, 2004, pp. 10.

Imperva Inc., Imperva™ SecureSphere™ Technical Description, 2004, pp. 20.

Imperva Inc., Imperva Unveils Next Generation Firewall Technology: Dynamic Profiling, SecureSphere 3.0 Delivers Total Application Security from Web, Worm and Database Threats, About Us, Press Releases, http://web.archive.org/web/20041015225044/www.imperva.com/company/news/2004-aug-23.html, Aug. 23, 2004, pp. 2, Foster City, California, USA.

Imperva Inc., Management & Reporting, http://web.archive.org/web/20041023204255/www.imperva.com/products/securesphere/management_reporting.html, Sep. 26, 2004, p. 1, vol. 3.0.

Imperva Inc., Imperva™ SecureSphere™ Securing the Enterprise Application Sphere, Apr. 1, 2004, pp. 2, vol. 2.0.

Imperva Inc., SecureSphere™ Dynamic Profiling Firewall Total Application Security, Products, SecureSphere™, Database, SecureSphere Datasheet, http://web.archive.org/web/20041215173241/www.imperva.com/products/securesphere/datasheet.html, 2004, pp. 4.

Imperva Inc., SecureSphere™ Dynamic Profiling Firewall Total Application Security, 2004, pp. 4.

Imperva Inc., Total Application Security with the SecureSphere Dynamic Profiling Firewall, http://www.infotechits.com/IT_Solutions/SecureSphere/securesphere_white_paper.pdf, 2004, pp. 1-10.

* cited by examiner

TECHNIQUES FOR TRACKING ACTUAL USERS IN WEB APPLICATION SECURITY SYSTEMS

CROSS REFERENCE TO RELATED APPLICATIONS

This application claims priority from US provisional application No. 60/739,955 filed on Nov. 28, 2005, the contents of which are incorporated herein by reference.

TECHNICAL FIELD

This disclosure relates generally to application level security systems, and more particularly to techniques for tracking hackers by such systems.

BACKGROUND OF THE TECHNOLOGY

Currently, a growing number of web applications require a client to carry out an authentication process prior to being granted access, and prior to being assigned with an application session. In the authentication process a client declares its identity to the system ("UserId") together with a proof of that identity (usually password based). The same identity must be presented for each application session involving a specific client.

In the related art there are at least two techniques used to perform authentication in web applications. The first technique is based on the authentication protocol semantics described in the Hypertext Transfer Protocol Request for Comments (HTTP RFC). In this technique the protected application responds with a 401 error code whenever authentication is required, the client then sends a request with the proper values in the "Authorization" header field and is authenticated by the application. If the application fails to authenticate the client it responds again with a 401 error (or a 403 error).

The second technique, also known as "form authentication", is more commonly used and relies on HTML forms in which the client types the UserID and password. The form is submitted to a specific module in the web application (using a HTTP request). The module evaluates the client's credentials and responds accordingly. In both techniques, once an authentication is successful, the client is not required to resend the credentials throughout the rest of the application session. Specifically, the server internally associates the session identifier sent to the user (in the form of a cookie) with the identification token representing that user.

Web application security systems are required to be able to correlate multiple requests that constitute a single attack. Traditional techniques, taken from network security domain, rely on the source IP address of the request. This type of correlation is inadequate in the domain of web applications because of the prevailing use of network address translation (NAT), on one hand, and the ability of an attacker to switch IP addresses quickly during an attack, on the other hand. Attacker can switch IP addresses either by using proxies, dial-up connection, or any other techniques. More advanced protection techniques rely on the notion of application session as maintained by the web server using some mechanism for keeping session for HTTP requests (e.g. cookies). While these are more adequate techniques, they fail to provide a robust solution since session creation is controlled by the client rather than the server. For example, a client may refuse to send an existing cookie and by that invoke the generation of a new session with a new cookie by the server. Therefore, it would be advantageous to provide a more robust correlation mechanism for web application protection.

SUMMARY

To realize some of the advantages noted above, there is provided a method for tracking and identifying an identity of a user accessing a web application. An application normal behavior profile (NBP), wherein said NBP includes a plurality of authentication identifiers of the web application is generated. It is determined using the NBP whether an authentication request submitted by the user was successful. A first actionable data on a successful authentication request is saved. A second actionable data on an unsuccessful authentication request is saved.

In another specific enhancement a corresponding user identification is attached to each subsequent authentication request submitted by the user.

In another specific enhancement the plurality of authentication identifiers comprise at least: an authentication form, a login pattern of the successful authentication request, a login pattern of the unsuccessful authentication request.

More specifically, the authentication form is a hypertext markup language (HTML) form.

More specifically, the login pattern includes at least one login indication and a value of said at least one login indication.

Even more specifically, the login indication comprises at least one of: a response code, existence of redirect directives, a target URL of redirect directives, and existence of the authentication form.

More specifically, the NBP is generated to include the plurality of authentication identifiers by a process including identifying at least one authentication form in a reply to the submitted authentication request and identifying at least one login pattern in the reply.

More specifically, identifying the authentication forms further includes analyzing said at least one authentication form in the reply. A search is conducted for at least one identifier parameter in the at least one authentication form. A number of occurrences of additional authentication forms that has the at least one identifier parameter during a predefined time interval is counted. The at least one authentication form is added to the NBP if the number of occurrences exceeds a predefined threshold.

More specifically, the identifier parameter comprises at least one of: an input field of type password, an input field of type text.

More identifying the at least one login pattern further includes marking each combination of login indications found in the reply. A number of observations of each combination during a predefined time interval is counted. A combination of login indications is determined as the login pattern of a successful authentication request if a corresponding number of observations exceeds a predefined threshold. A combination of login indications is determined as the login pattern of an unsuccessful authentication request if a corresponding number of observations is below a predefined threshold.

More specifically, determining whether the authentication request was successful further includes extracting values of the login indications from a response associated with the authentication request. It is checked if the extracted values of the login indications exist in the NBP. It is determined that the authentication request was successful if the extracted values exist in the NBP.

In another specific enhancement the actionable data on the successful authentication request comprises at least one of: a user identification, a session identification, a user name, an internet protocol address, actions preformed by the user.

More specifically, the actionable data on the successful authentication request is utilized to track users across many sessions and days.

In another specific enhancement the first actionable data on the unsuccessful authentication request comprises at least one of: a session identification, a user identification, an internet protocol address associated with the user.

More specifically, second actionable data on the unsuccessful authentication request is utilized for detecting brute force attacks.

Another aspect of the disclosed teachings is a computer program product including a computer readable medium having instructions for enabling a computer to perform the above discussed methods.

Still another aspect of the disclosed teachings is security system having user awareness capabilities for tracking and identifying the identity of users accessing a web application, the system comprises a secure server coupled to a secure gateway and operable to generate an application normal behavior profile (NBP) that includes at least a plurality of authentication identifiers of the web application. At least one secure gateway is installed in a line of traffic between a client and a web server and operable to determine using the NBP whether an authentication request from the client was successful.

In another specific enhancement the authentication request is submitted by a user.

More specifically, the secure gateway is further operable to save first actionable data on a successful authentication request and further operable to save second actionable data on an unsuccessful authentication request and labeling each authentication request with an identity of the actual user.

In another specific enhancement, the system is further operable to identify authentication forms in replies to submitted authentication requests and identify login patterns in replies to the submitted authentication requests.

More specifically, to determine whether the authentication request was successful, the system is operable to extract values of at least login indications from a response associated with the authentication request, and further operable to check if the extracted values of the login indications exist in the NBP; and further operable to determine that the authentication request was successful if the extracted values exist in the NBP.

More specifically, the first actionable data on the successful authentication request comprises at least one of: a user identification, a session identification, a user name, an internet protocol address, actions preformed by the user.

More specifically, the first actionable data actionable data on the successful authentication request is utilized to track users across many sessions and days.

More specifically, the second actionable data on the unsuccessful authentication request comprises at least one of: a session identification, a user identification, an internet protocol address associated with the user.

More specifically, the second actionable data on the unsuccessful authentication request is utilized for detecting brute force attacks.

BRIEF DESCRIPTION OF THE DRAWINGS

The above objectives and advantages of the disclosed teachings will become more apparent by describing in detail preferred embodiments thereof with reference to the attached drawings in which.

DETAILED DESCRIPTION

Techniques for automatically identifying the client identity as embodied by the UserID of each application session are disclosed. Specifically, techniques for identifying the specific module in a web application that validates credentials and for assessing whether a specific authentication request was successful or not are disclosed. Also disclosed is a web application security system having user awareness capabilities.

Using the disclosed techniques in a web application security system that is capable of tracking application sessions, each and every client request can be labeled with the identity of the actual user. Thus, robust correlation mechanism based on the actual client that generated the request is achieved. A web application security system can use the user awareness capabilities for a more accurate detection of attacks. It also has a better attack thwarting mechanism. For example, it can block all session of a user rather than a single session. The system provides a better and more meaningful attack reporting. Furthermore, an operator can take actions against an actual user. Better auditing of application access can be provided. For example, an operator can monitor any behavior of specific clients. Furthermore, by using the techniques disclosed, web applications can be protected against specific attacks that are aimed at the authentication process such as brute force guessing.

Figure 1:
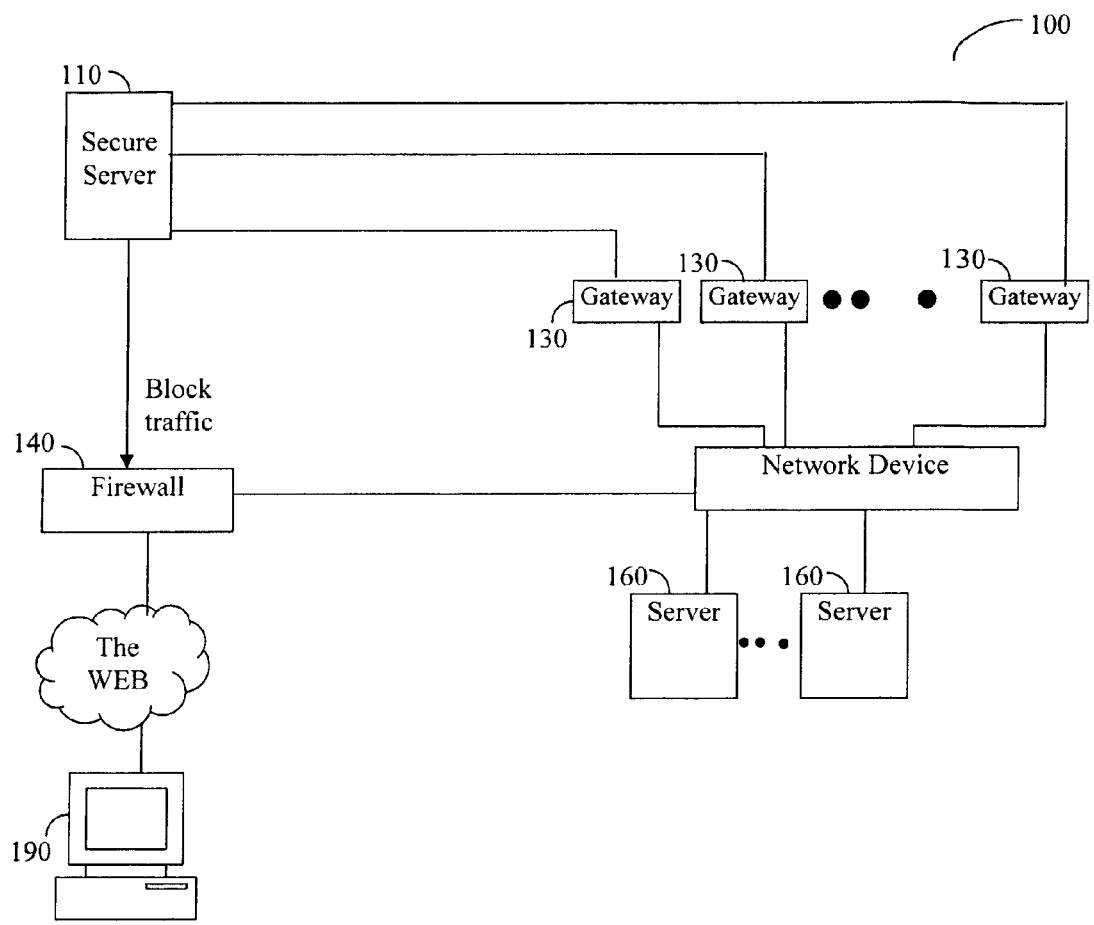
FIG. 1 is a diagram of an application level security system in accordance with an exemplary embodiment of the disclosed teachings.

FIG. 1 shows a non-limiting and exemplary diagram of an application level security system 100 that carries out the techniques disclosed. Security system 100 includes a plurality of secure gateways 130 connected to a secure server 110. Secure gateways 130 may be connected to server 110 through out-of-band network (not shown) for transferring traffic over a dedicated and secure network that is completely separated from the production traffic. A secure gateway 130 is placed on each network segment that includes servers 160 (e.g., Web or database servers) to be protected. Access to one or more Web applications that reside on one of servers 160 is permitted only after a user successfully logs-on to server 160. For this purpose, server 160 provides an authentication service as described in greater detail herein.

Security system 100 is a non-intrusive system, and thus each of secure gateways 130 is configured to operate in the line of traffic, i.e., traffic passing directly through the secure gateways 130 to protected server 160. Specifically, each of the secure gateways 130 gathers, and reconstructs application requests sent to protected server 160. A secure gateway 130 further matches the reconstructed request against a predetermined application normal behavior profile (NBP). Application requests are sent by client 190.

A NBP is generated by the secure server 110 and includes a plurality of application attributes such as uniform resource locators (URLs), cookies, users' information, IP addresses, query statements, and many others. These attributes determine the normal behavior of the protected application. If one or more of the application requests do not match the NBP an alert providing an indication of a potential attack is produced. In accordance with the exemplary implementation of the disclosed teachings, a NBP includes at least a list of authentication (or login) forms, i.e., web pages that encapsulate an authentication service. For each such form, a NBP further includes a list of login indications and their values. Secure gateways 130 monitor incoming requests in order to detect candidate authentication forms. These forms are forwarded to secure server 110 which determines if they should be included in the NBP. If so, secure server 110 updates the NBP of the protected application. Additionally, secure gateways 130 monitor responses that result from login requests. In these responses, each secure gateway 130 looks for values of the login indications and passes them to secure server 110, which in turn determines if these values indicate a successful login. If so, the NBP is updated and uploaded to secure gateways 130.

Figure 2:
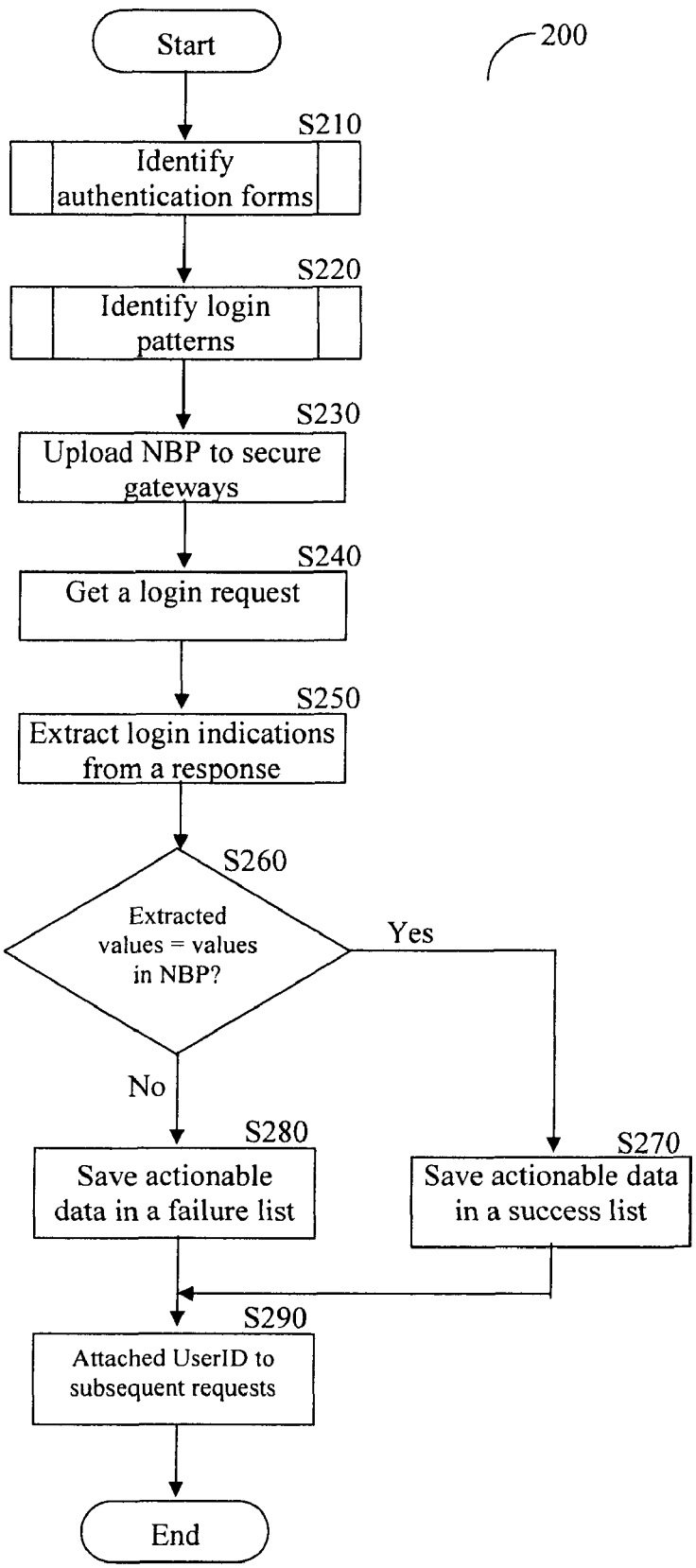
FIG. 2 is a flowchart describing the method for detecting authentication operations and generating actionable data in accordance with an exemplary embodiment of the disclosed teachings.

FIG. 2 shows a non-limiting and exemplary flowchart 200 describing the technique for detecting authentication operations and generating actionable data from such operations, in accordance with certain aspects of the disclosed teachings. At S210, a process for identifying authentication forms in the protected web application is applied.

Figure 3:
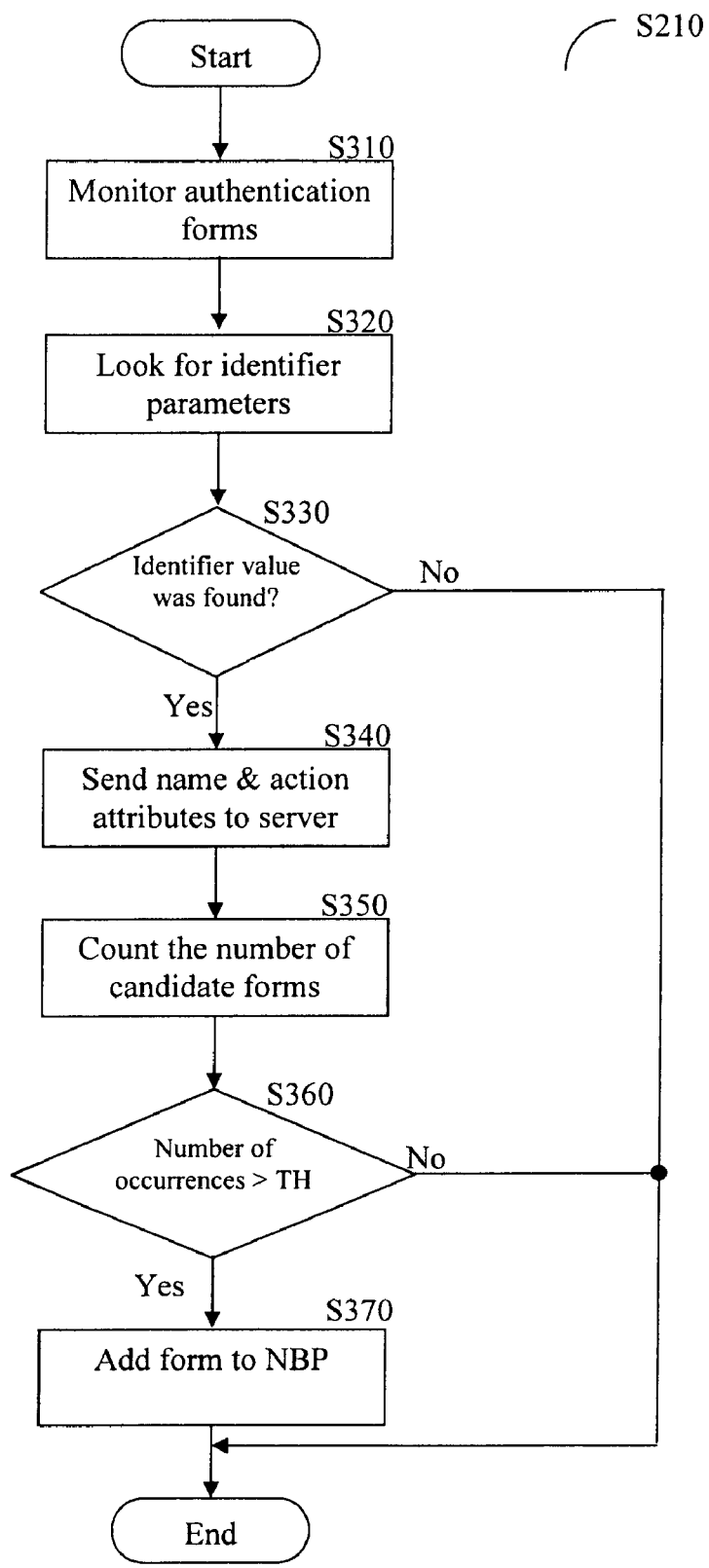
FIG. 3 is a flowchart describing the process for identifying authentication forms in accordance with an exemplary embodiment of the disclosed teachings.

FIG. 3 shows an example of the execution of S210 in greater detail. At S310, the server replies are monitored and inspected for HTML forms. An HTML form is identified by the FORM tag and includes one or more INPUT tags. The FORM tag contains an ACTION attribute, i.e., a URL that specifies the target page, which handles the input from a user. This page may be the embodiment of the authentication service. At S320, in each of the forms discovered at S310, the process looks for the identifier parameters. As a non-limiting example such parameter may be: a single input field of type "password". This identifier parameter can be further corroborated with heuristics regarding the "NAME" attribute of this field such as "passwd", "pass", "RegPass", "pass_*", "pswd", "UserPassword", "user_password", "login_password", "pc", "user_pin", "pin". As another example, an identifier parameter may be two input fields of type "text". This indication can be further corroborated with heuristics regarding the "NAME" attribute of the fields such as "login", "id", "user", "user_id", "UserId", "user_name", "UserName", "LoginName", "email", "login_email", "nick_*".

At S330, it is checked if a form includes the identifier parameters tested for in S320, and if so it is considered a candidate and execution continues with S340; otherwise, execution terminates. At S340, the value of the "ACTION" attribute together with the "NAME" attribute of the first text field are sent to the server 110. At S350, secure server 110 counts the number of occurrences of each candidate form during a predefined time interval (e.g., 24 hours). At S360, the number of occurrences is compared to a predefined threshold. If the count exceeds the threshold, the candidate form is actually an authentication form and added, at S370, to the NBP of the protected application; otherwise, execution terminates.

Referring back to FIG. 2 where at S220, a process for learning the pattern of successful and failed login operations is applied. Secure server 110 dose not hold the authentication data of users. Therefore, when a user authenticates, secure server 110 cannot determine whether it is a successful or failed login by using the UserID and password entered by the user, and thus such a decision is made based on the response sent by server 160.

Figure 4:
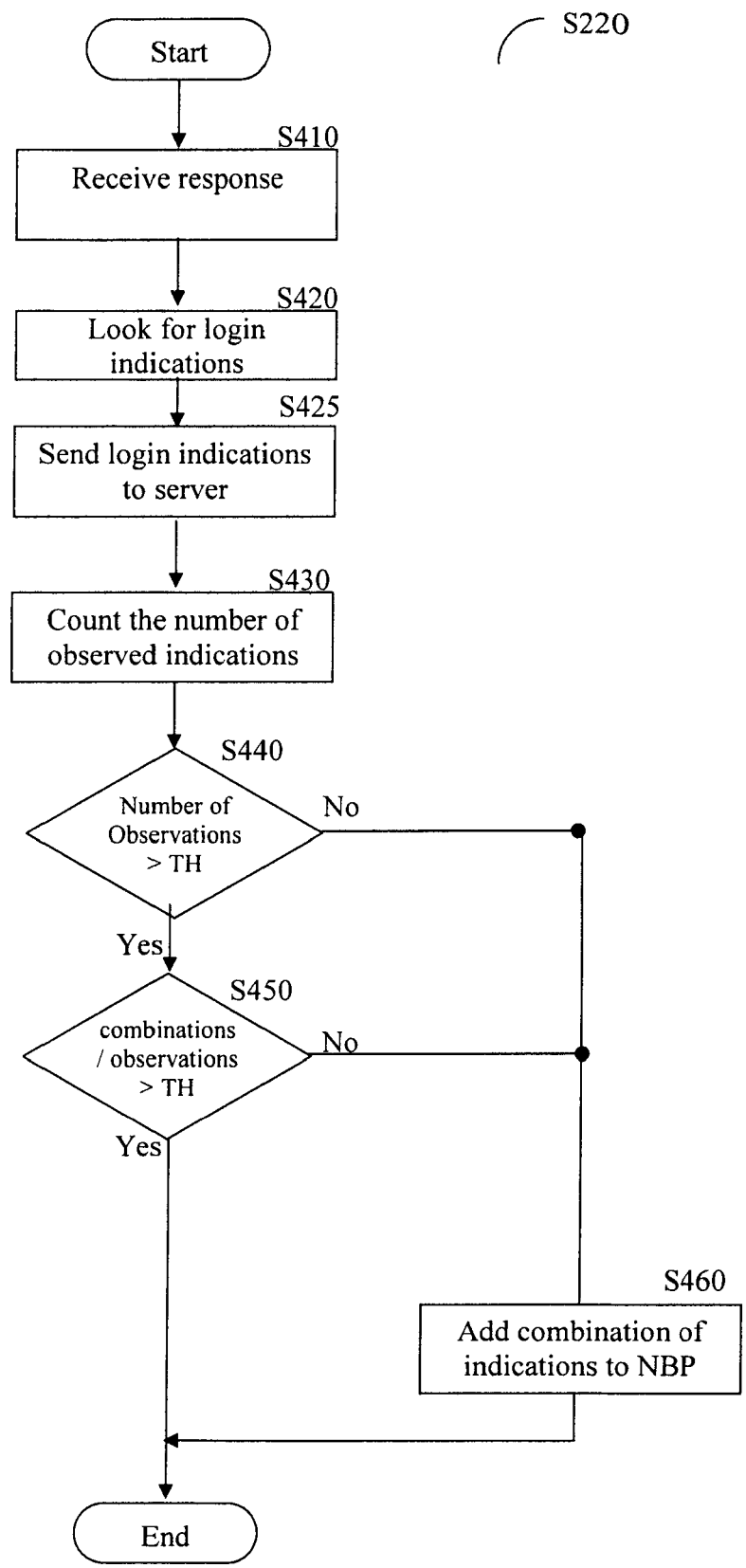
FIG. 4 is a flowchart describing the process for identifying successful logins in accordance with an exemplary embodiment of the disclosed teachings.

FIG. 4 shows an example of the execution of S220 in greater detail. At S410, a response that a server 160 sends back to client 190 is received. Such a response is a reply to a login request. At S420, in each such response the process looks for one or more login indications. These login indications include at least a response code, existence of redirect directives, a target URL of redirect directives, and the existence of an authentication form (as described above) in the HTML part of the response. At S425, the indications are sent to secure server 110. At S430, each combination of indications is given a unique marking and a counter is maintained for the number of observations of each combination. At S440 it is checked whether the number of observations exceeds a given threshold (e.g. 100 login attempts). If so, execution continues at S450, otherwise execution ends. At S450, secure server 110 checks for the combination of indications (or group of such combinations) whose proportion within the total number of observation exceeds a given threshold (e.g. 80%). This combination of indications is then declared to indicate a successful authentication and is added, at S460, to the NBP. It should be noted that the technique described in FIG. 4 teaches how to detect responses that represent successful logins. However, a person skilled in the art can easily adapt this process to identify responses representing failed logins.

Referring back to FIG. 2 where at step S230 the updated NBP, that includes the learnt authentication forms and successful login indications, is uploaded to secure gateways 130, and subsequently, system 100 switches to a protection mode that begins with step S240.

At S240, a secure gateway 130 receives a login request and waits for the respective response from a server 160 that handles this request. At S250, the secure gateway 130 extracts login indications from the response and, at S260, compares them to the values saved in the NBP. If a match exists, then it is considered as a successful login and execution continues with S270; otherwise, the login has failed and execution continues at S280. At S270, parameters such as the UserID, SessionID, and the actions that the user preformed, are saved in a success list. This list may further include an IP address, a user name, and other related information. The actionable data in the success list can be used to track a user across many sessions and days and take actions against specific users. For example, a security officer can provide the authorities with incriminating data, stored in the success list, of users who committed unauthorized actions in the protected application. At S280, the session ID, UserID and preferably an IP address associated with a user that failed to login are saved in a failure list. At S290, the user identity (i.e., UserID and username) is attached to subsequent requests that belong to the same session. In an exemplary embodiment, static based authorization rules may be applied on a request. For example, an authorization rule may define that a specific URL can be accessed only by designated users.

In another exemplary embodiment, the information kept in the failure list can be used for the detection of brute force attacks. Such attacks are committed by trying large number of password combinations until a combination is found that enables the penetration into the application. In order to detect such attacks, system 100, using data in the failure list, counts the number of failed logins from the same UserID over a predetermined short period of time. If and when the count exceeds a predefined threshold an alert is generated.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for tracking and identifying an identity of a user using a client to access a web application on a protected server, the method comprising:
monitoring, by a secure gateway on a device, client requests for the web application sent from a client to the protected sever, and replies to those client requests sent from the protected server to the client;
identifying candidate authentication forms in the replies to the client requests sent from the protected server to the client;
determining which of the candidate authentication forms in those replies are authentication forms;
generating a normal behavior profile (NBP) for the web application, wherein said NBP includes authentication form identifiers corresponding to those of the candidate authentication forms determined to be the authentication forms;
monitoring, by the secure gateway using the authentication form identifiers, login requests sent from the client to the protected server, and login responses sent from the protected server to the client in response to the login requests;
identifying, for each of the authentication form identifiers in the NBP, a combination of login indications and corresponding values in the login responses that indicates a successful login request;
generating an updated NBP by adding to the NBP, for each of the authentication form identifiers in the NBP, the combination of login indications and corresponding values identified to be indicating a successful login request;
determining by the secure gateway using the updated NBP whether a subsequent login request submitted by the user was successful;
saving a first actionable data if the subsequent login request is determined to be successful, wherein the first actionable data comprises user identifiers associated with the user for tracking the user across a plurality of sessions; and
saving a second actionable data if the subsequent login request is determined to be unsuccessful.

2. The method of claim 1, further comprising:
attaching a corresponding user identification to each subsequent login request submitted by the user.

3. The method of claim 1, wherein the updated NBP further includes, for each of the authentication form identifiers in the NBP, a combination of login indications and corresponding values indicating an unsuccessful login request.

4. The method of claim 1, wherein the authentication forms are hypertext markup language (HTML) forms.

5. The method of claim 1, wherein the combination of login indications comprises at least one of: a response code, existence of redirect directives, and a target URL of redirect directives.

6. The method of claim 1, wherein the determining which of the candidate authentication forms are authentication forms includes:
counting a number of occurrences of each of the candidate authentication forms during a predefined time interval; and
determining that the candidate authentication forms are in fact authentication forms if the corresponding number of occurrences exceeds a predefined threshold.

7. The method of claim 6, wherein the candidate authentication forms are identified by identifier parameters comprising at least one of: an input field of type password, and an input field of type text.

8. The method of claim 1, wherein the identifying combination of login indications and corresponding values that indicates a successful login request includes:
counting a number of observations of each combination of login indications and corresponding values during a predefined time interval;
determining a combination of login indications and corresponding values indicates a successful login request if a corresponding number of observations exceeds a predefined threshold; and
determining a combination of login indications and corresponding values indicates an unsuccessful login request if a the corresponding number of observations is below the predefined threshold.

9. The method of claim 1, wherein the determining whether the subsequent login request was successful includes:
extracting from a login response associated with the subsequent login request, a combination of login indications and corresponding values in that login response; and
determining that the subsequent login request was successful if the extracted combination exist in the updated NBP.

10. The method of claim 1, wherein the first actionable data comprises at least one of: a user identification, a session identification, a user name, an internet protocol address, and actions performed by the user.

11. The method of claim 1, wherein the second actionable data comprises at least one of: a session identification, a user identification, and an internet protocol address associated with the user.

12. The method of claim 11, wherein the second actionable data is utilized for detecting brute force attacks.

13. A computer program product including a non-transitory computer-readable storage medium comprising instructions, said instructions when executed on a computer enables the computer to implement a method to track and identify identity of a user using a client to access a web application on a protected server, the method comprising:
monitoring client requests for the web application sent from a client to the protected sever, and replies to those client requests sent from the protected server to the client;
identifying candidate authentication forms in the replies to the client requests sent from the protected server to the client;
determining which of the candidate authentication forms in those replies are authentication forms;
generating a normal behavior profile (NBP) associated with the web application, wherein said NBP includes authentication form identifiers corresponding to those of the candidate authentication forms determined to be the authentication forms;
monitoring, using the authentication form identifiers, login requests sent from the client to the protected server, and login responses with login indications sent from the protected server to the client in response to the login requests;
identifying, for each of the authentication form identifiers in the NBP, a combination of login indications and corresponding values in the login responses that indicates a successful login request;

generating an updated NBP by adding to the NBP, for each of the authentication form identifiers in the NBP, the combination of login indications and corresponding values identified to be indicating a successful login request;

determining, using the updated NBP, whether a subsequent login request submitted by the user was successful;

saving a first actionable data if the subsequent login request is determined to be successful; and saving a second actionable data if the subsequent login request is determined to be unsuccessful.

14. The computer program product of claim 13, wherein the implemented method further comprises:

attaching a corresponding user identification to each subsequent login request submitted by the user.

15. The computer program product of claim 13, wherein the updated NBP further includes, for each of the authentication form identifiers in the NBP, a combination of login indications and corresponding values indicating an unsuccessful login request.

16. The computer program product of claim 13, wherein the authentication forms are hypertext markup language (HTML) forms.

17. The computer program product of claim 13, wherein the combination of login indications comprises at least one of: a response code, existence of redirect directives, and a target URL of redirect directives.

18. The computer program product claim 13, wherein the determining which of the candidate authentication forms are authentication forms includes:

counting a number of occurrences of each of the candidate authentication forms during a predefined time interval; and determining that the candidate authentication forms are in fact authentication forms if the corresponding number of occurrences exceeds a predefined threshold.

19. The computer program product of claim 18, wherein the candidate authentication forms are identified by identifier parameters comprising at least one of:

an input field of type password, and an input field of type text.

20. The computer program product of claim 13, wherein the identifying the combination of login indications and corresponding values that indicates a successful login request includes:

counting a number of observations of each combination of login indications and corresponding values during a predefined time interval;

determining a combination of login indications and corresponding values indicates a successful login request if a corresponding number of observations exceeds a predefined threshold; and determining a combination of login indications and corresponding values indicates an unsuccessful login request if a the corresponding number of observations is below the predefined threshold.

21. The computer program product of claim 13, wherein the determining whether the subsequent login request was successful includes:

extracting from a login response associated with the subsequent login request, a combination of login indications and corresponding values in that login response; and determining that the subsequent login request was successful if the extracted combination exist in the updated NBP.

22. The computer program product of claim 13, wherein the first actionable data comprises at least one of: a user identification, a session identification, a user name, an internet protocol address, and actions performed by the user.

23. The computer program product of claim 22, wherein the first actionable data is utilized to track the user across a plurality of sessions.

24. The computer program product of claim 13, wherein the second actionable data comprises at least one of: a session identification, a user identification, and an IP address associated with the user.

25. The computer program product of claim 24, wherein the second actionable data is utilized for detecting brute force attacks.

26. A security system having user awareness capabilities for tracking and identifying the identity of users accessing a web application on a protected server, the system comprises:

a secure server coupled to a secure gateway and operable to generate an application normal behavior profile (NBP) that includes:

authentication form identifiers of the web application, wherein the authentication form identifiers corresponds to those of candidate authentication forms, that are in replies sent from the protected server to a client in response to client requests for the web application, determined to be actual authentication forms; and for each of the authentication form identifiers, a combination of login indications and corresponding values indicating a successful login request, wherein the login indications are in login responses sent from the protected server to the client in response to the login requests associated with the authentication forms; and at least one secure gateway installed in a line of traffic between a client and a web server and operable to determine using the application NBP whether a login request from the client was successful.

27. The security system of claim 26, wherein the login request is submitted by a user.

28. The security system of claim 27, wherein the secure gateway is further operable to save first actionable data on a successful login request and further operable to save second actionable data on an unsuccessful login request and labeling each login request with an identity of the actual user.

29. The security system of claim 27, wherein to determine whether the login request was successful, the system is operable to extract values of a combination of login indications and corresponding values from a login response associated with the login request; and further operable to determine that the login request was successful if the extracted combination exist in the application NBP.

30. The security system of claim 28, wherein the first actionable data comprises at least one of: a user identification, a session identification, a user name, an internet protocol address, and actions performed by the user.

31. The security system of claim 30, wherein the first actionable data actionable data is utilized to track users across a plurality of sessions.

32. The security system of claim 28, wherein the second actionable data comprises at least one of: a session identification, a user identification, and an internet protocol address associated with the user.

33. The security system of claim 32, wherein the second actionable data is utilized for detecting brute force attacks.

34. A method for tracking and identifying an identity of a user using a client to access a web application on a protected server, the method comprising:

receiving an application normal behavior profile (NBP) of the web application at a secure gateway on a device, wherein the application NBP includes:
  authentication form identifiers corresponding to authentication forms that have been in replies sent from the protected server to a client in response to client requests for the web application; and
  for each of the authentication form identifiers, a successful login pattern that includes a combination of login indications and corresponding values indicating a successful login request, wherein the successful login pattern was sent in login responses from the protected server to the client in response to the login requests that include the authentication forms with user entered information and that have been successfully authenticated;
determining by the secure gateway using the application NBP whether a subsequent login request submitted by the user was successful; and
storing a first actionable data if the subsequent login request was successful, wherein the first actionable data comprises user identifiers associated with the user to track the user across a plurality of sessions.

35. The method of claim 34, wherein the application NBP further includes, for each of the authentication form identifiers in the application NBP, at least one combination of login indications and corresponding values indicating an unsuccessful login request.

36. The method of claim 34, wherein the authentication forms are hypertext markup language (HTML) forms.

37. The method of claim 34, wherein the combination of login indications comprises at least one of: a response code, existence of redirect directives, and a target URL of redirect directives.

38. The method of claim 34, wherein the determining whether the subsequent login request was successful includes:
  extracting, from a login response associated with the subsequent login request, a combination of login indications and corresponding values in that login response; and
  determining that the subsequent login request is successful if the extracted combination matches one of the successful login indications in the application NBP.

39. The method of claim 34, wherein the first actionable data comprises at least one of: a user identification, a session identification, a user name, an internet protocol address, and actions performed by the user.

40. The method of claim 34, further comprising:
  storing a second actionable data if the subsequent login request is unsuccessful.

41. The method of claim 40, wherein the second actionable data comprises at least one of: a session identification, a user identification, and an internet protocol address associated with the user.

42. The method of claim 40, wherein the second actionable data is utilized for detecting brute force attacks.

43. A computer program product including a non-transitory computer-readable storage medium comprising instructions, said instructions when executed on a computer enables the computer to implement a method to track and identify identity of a user using a client to access a web application on a protected server, the method comprising:
  receiving an application normal behavior profile (NBP) of the web application at a secure gateway on a device, wherein the application NBP includes:
    authentication form identifiers corresponding to authentication forms that have been in replies sent from the protected server to a client in response to client requests for the web application; and
    for each of the authentication form identifiers, a successful login pattern that includes a combination of login indications and corresponding values indicating a successful login request, wherein the successful login pattern was sent in login responses from the protected server to the client in response to the login requests that include the authentication forms with user entered information and that have been successfully authenticated;
  determining by the secure gateway using the application NBP whether a subsequent login request submitted by the user was successful; and
  storing a first actionable data if the subsequent login request was successful, wherein the first actionable data comprises user identifiers associated with the user to track the user across a plurality of sessions.

44. The computer program product of claim 43, wherein the application NBP further includes, for each of the authentication form identifiers in the application NBP, at least one combination of login indications and corresponding values indicating an unsuccessful login request.

45. The computer program product of claim 43, wherein the authentication forms are hypertext markup language (HTML) forms.

46. The computer program product of claim 43, wherein the combination of login indications comprises at least one of: a response code, existence of redirect directives, and a target URL of redirect directives.

47. The computer program product of claim 43, wherein the determining whether the subsequent login request was successful includes:
  extracting, from a login response associated with the subsequent login request, a combination of login indications and corresponding values in that login response; and
  determining that the subsequent login request is successful if the extracted combination matches one of the successful login indications in the application NBP.

48. The computer program product of claim 43, wherein the first actionable data comprises at least one of: a user identification, a session identification, a user name, an internet protocol address, and actions performed by the user.

49. The computer program product of claim 43, wherein the implemented method further comprising:
  storing a second actionable data if the subsequent login request is unsuccessful.

50. The computer program product of claim 49, wherein the second actionable data comprises at least one of: a session identification, a user identification, and an internet protocol address associated with the user.

51. The computer program product of claim 49, wherein the second actionable data is utilized for detecting brute force attacks.

52. A method in a system coupled between a protected server and a client for tracking successful logins to the protected server by a user using the client, the method comprising:
  automatically learning an authentication form by inspecting replies being sent from the protected server to the client, wherein the protected server sends the authentication form to the client as part of an authentication service to allow the user to log on to the protected server;

automatically learning, using the learnt authentication form, a combination of login indications and values for those login indications that indicates a successful login, wherein the automatically learning the combination of login indications and the values includes:
monitoring login responses being sent from the protected server to the client, wherein the login responses are those responses sent by the protected server to the client in reply to login requests that include the learnt authentication form with user entered information and that are sent from the client to the protected server;
generating an application normal behavior profile (NBP) that includes, for the learnt authentication form, the combination of login indications and the values of those login indications determined to indicate the successful login; and
determining by a secure gateway on a device of the system using the application NBP whether a subsequent login request was successful by using the application NBP and respective login response to that subsequent login request.

53. The method of claim 52, wherein the automatically learning the combination of login indications and the values also includes automatically learning combination of login indications and their values in login responses that indicates a failed login.

54. The method of claim 52, wherein the combination of login indications comprises at least one of: a response code, existence of redirect directives, and a target URL of redirect directives.

55. The method of claim 52, wherein the monitoring login responses includes:
counting a number of observations of each of a plurality of combinations of login indications and corresponding values during a predefined time interval; and
determining that at least one of the combinations of login indications and corresponding values indicates a successful login if the corresponding number of observations exceeds a predefined threshold.

56. The method of claim 52, wherein the automatically learning an authentication form includes:
identifying candidate authentication forms in the replies being sent from the protected server to the client;
counting a number of occurrences of each of the candidate authentication forms identified; and
determining that at least one of the candidate authentication forms is in fact an authentication form if the number of occurrences exceeds a predefined threshold.

57. The method of claim 56, wherein the candidate authentication forms are identified by identifier parameters comprising at least one of: an input field of type password, and an input field of type text.

58. A computer program product including a non-transitory computer-readable storage medium comprising instructions, said instructions when executed on a computer enables the computer to implement a method for tracking successful logins to a protected server by a user using a client, the method comprising:
automatically learning an authentication form by inspecting replies being sent from the protected server to the client, wherein the protected server sends the authentication form to the client as part of an authentication service to allow the user to log on to the protected server;
automatically learning, using the learnt authentication form, a combination of login indications and values for those login indications that indicates a successful login, wherein the automatically learning the combination of login indications and the values includes:
monitoring login responses being sent from the protected server to the client, wherein the login responses are those responses sent by the protected server to the client in reply to login requests that include the learnt authentication form with user entered information and that are sent from the client to the protected server;
generating an application normal behavior profile (NBP) that includes, for the learnt authentication form, the combination of login indications and the values of those login indications determined to indicate the successful login; and
determining by a secure gateway on a device of the system using the application NBP whether a subsequent login request was successful by using the application NBP and respective login response to that subsequent login request.

59. The computer program product of claim 58, wherein the automatically learning the combination of login indications and the values also includes automatically learning combination of login indications and their values in login responses that indicates a failed login.

60. The computer program product of claim 58, wherein the combination of login indications comprises at least one of: a response code, existence of redirect directives, and a target URL of redirect directives.

61. The computer program product of claim 58, wherein automatically learning the combination of login indications and the values includes:
counting a number of observations of each of a plurality of combinations of login indications and corresponding values during a predefined time interval; and
determining that at least one of the combinations of login indications and corresponding values indicates a successful login if the corresponding number of observations exceeds a predefined threshold.

62. The computer program product of claim 58, wherein the automatically learning an authentication form includes:
identifying candidate authentication forms in the replies being sent from the protected server to the client;
counting a number of occurrences of each of the candidate authentication forms identified; and
determining that at least one of the candidate authentication forms is in fact an authentication form if the number of occurrences exceeds a predefined threshold.

63. The computer program product of claim 62, wherein the candidate authentication forms are identified by identifier parameters comprising at least one of: an input field of type password, and an input field of type text.

64. A method in a system coupled between a protected server and clients for tracking successful logins to the protected server by users using the clients, the method comprising:
automatically learning authentication forms by monitoring replies being sent from the protected server to the clients for identifier parameters indicative of authentication forms, wherein the protected server sends such authentication forms to the clients as part of an authentication service to allow the users to log on to the protected server;
automatically learning, for the learnt authentication forms, login patterns that when present in login responses being sent from the protected server to the client indicate successful logins, the automatically learning the login patterns includes, identifying login attempts, sent from the clients to the protected server, in the form of login requests that include the learnt authentication forms with user entered information;

monitoring, by a secure gateway on a device of the system, the login responses sent from the protected server to the clients that are in reply to the identified login attempts; and determining which combinations of login indications and their values in the login responses are the login patterns of successful logins;

generating, by a secure server, an application normal behavior profile (NBP) that represents, for the learnt authentication forms, the login patterns of successful logins; and determining by the secure gateway whether a subsequent login request was successful by using the application NBP and respective login response to that subsequent login request.

65. The method of claim 64, wherein the automatically learning the login patterns also includes determining which combinations of login indications and their values in the login responses are login patterns of failed logins.

66. The method of claim 64, wherein the combination of login indications comprises at least one of: a response code, existence of redirect directives, and a target URL of redirect directives.

67. The method of claim 64, wherein the determining which combinations of login indications and their values includes:

counting a number of observations of each of the combinations and their values during a predefined time interval; and determining that those of the combinations of login indications and their values whose corresponding number of observations exceeds a predefined threshold are the login patterns of successful logins.

68. The method of claim 64, wherein the automatically learning authentication forms includes:

identifying candidate authentication forms in the replies being sent from the protected server to the client;

counting a number of occurrences of each of the candidate authentication forms identified; and determining that at least one of the candidate authentication forms is in fact an authentication form if the number of occurrences exceeds a predefined threshold.

69. The method of claim 68, wherein the identifier parameter comprises at least one of: an input field of type password, and an input field of type text.

70. A computer program product including a non-transitory computer-readable storage medium comprising instructions, said instructions when executed in a system enables a method for tracking successful logins to a protected server by users using clients, the method comprising:

automatically learning authentication forms by monitoring replies being sent from the protected server to the clients for identifier parameters indicative of authentication forms, wherein the protected server sends such authentication forms to the clients as part of an authentication service to allow the users to log on to the protected server;

automatically learning, for the learnt authentication forms, login patterns that when present in login responses being sent from the protected server to the client indicate successful logins, the automatically learning the login patterns includes, identifying login attempts, sent from the clients to the protected server, in the form of login requests that include the learnt authentication forms with user entered information;

monitoring, by a security gateway on a device of the system, the login responses sent from the protected server to the clients that are in reply to the identified login attempts; and determining which combinations of login indications and their values in the login responses are the login patterns of successful logins;

generating, by a secure server, an application normal behavior profile (NBP) that represents, for the learnt authentication forms, the login patterns of successful logins; and determining by the secure gateway whether a subsequent login request was successful by using the application NBP and respective login response to that subsequent login request.

71. The computer program product of claim 70, wherein the automatically learning the login patterns also includes determining which combinations of login indications and their values in the login responses are login patterns of failed logins.

72. The computer program product of claim 70, wherein the combination of login indications comprises at least one of: a response code, existence of redirect directives, and a target URL of redirect directives.

73. The computer program product of claim 70, wherein the determining which combinations of login indications and their values includes:

counting a number of observations of each of the combinations and their values during a predefined time interval; and determining that those of the combinations of login indications and their values whose corresponding number of observations exceeds a predefined threshold are the login patterns of successful logins.

74. The computer program product of claim 70, wherein the automatically learning authentication forms includes:

identifying candidate authentication forms in the replies being sent from the protected server to the client;

counting a number of occurrences of each of the candidate authentication forms identified; and determining that those of the candidate authentication forms whose corresponding number of occurrences exceeds a predefined threshold is in fact authentication forms.

75. The computer program product of claim 74, wherein the identifier parameter comprises at least one of: an input field of type password, and an input field of type text.

76. A system, coupled between a protected server and clients, having user awareness capabilities for tracking, across a plurality of sessions, successful logins to the protected server by users using the clients, the system comprises:

a secure gateway installed in a line of traffic between the client and the protected server and to:

inspect, as part of an automatic process for learning an authentication form used as part of an authentication service to allow the users to log on to the protected server, for occurrences of the authentication form in replies being sent from the protected server to the clients;

monitor, as part of an automatic process for learning a login pattern indicative of a successful login, for observations of the login patterns in login responses being sent from the protected server to the clients, wherein the login responses are in those responses sent by the protected server to the clients in reply to login attempts being sent from the clients to the protected server that include the authentication form with user entered information;

a secure server coupled to the secure gateway and to automatically generate an application NBP that represents the login pattern of the successful login for the authentication form; and the secure gateway is also to determine whether a subsequent login request was successful by using the application NBP and respective login response to that subsequent login request.

77. The system of claim 76, wherein the authentication form is a hypertext markup language (HTML) form.

78. The system of claim 76, wherein the authentication form is learned if the number of occurrences of that authentication exceeds a predefined threshold.

79. The system of claim 76, wherein the login pattern includes a combination of login indications and their values, the login indications being at least one of: a response code, existence of redirect directives, and a target URL of redirect directives.

80. The system of claim 76, wherein the login pattern of successful logins is learned if the number of observations of that login pattern exceeds a predefined threshold.

81. The system of claim 80, wherein the login responses are also monitored for learning login patterns of failed logins, and each of the login patterns of failed logins are learned if a corresponding number of observations of that login pattern being sent in login responses from the protected server to the clients are below the predefined threshold.

* * * * *